United States Patent Office 3,450,207
Patented June 17, 1969

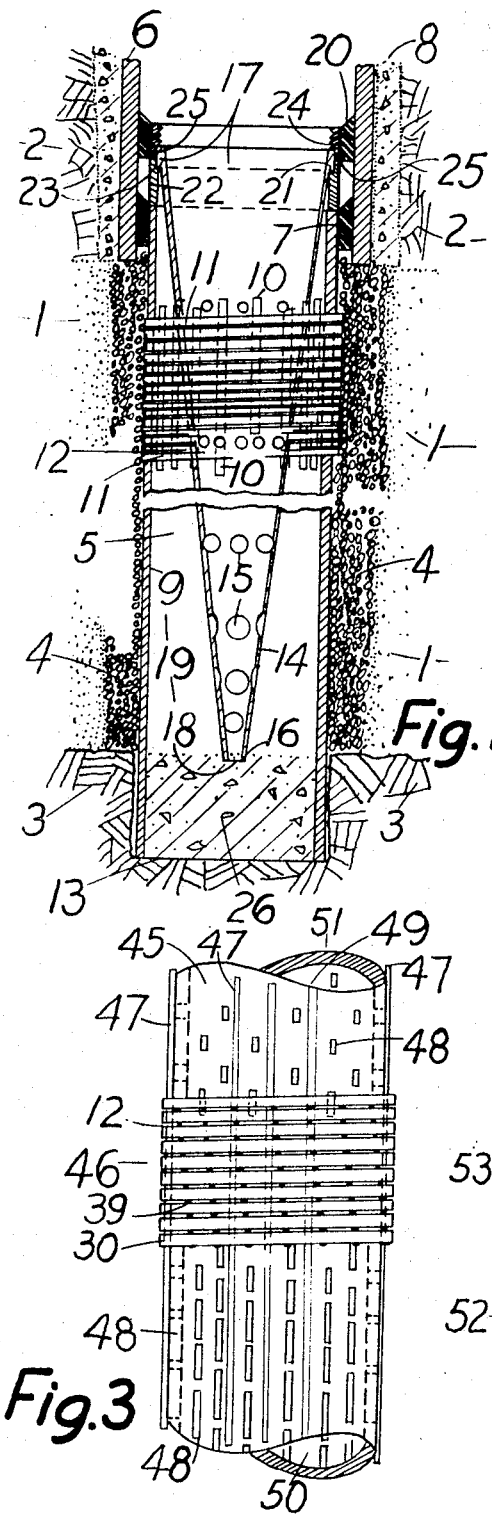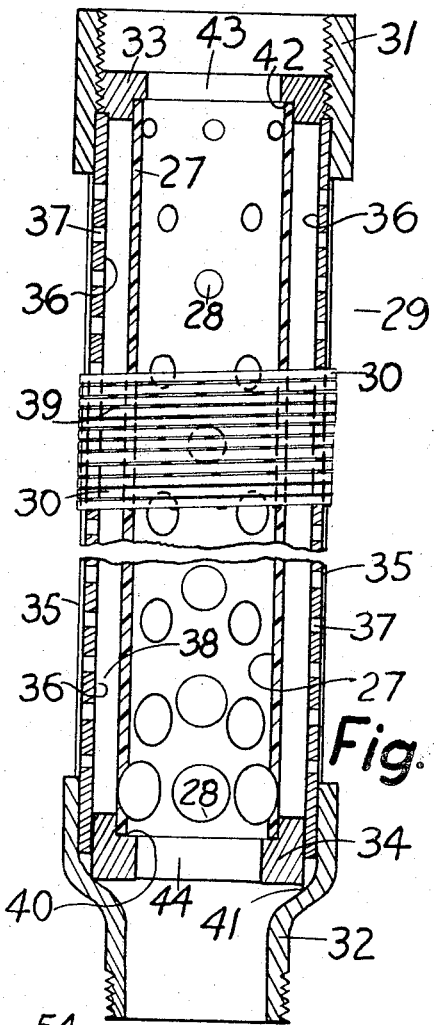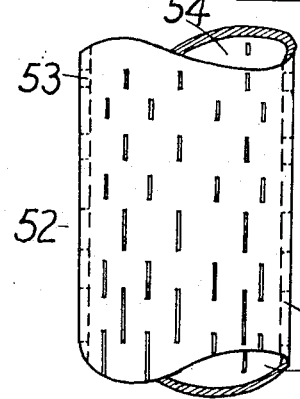

3,450,207
INFLOW EQUALIZER FOR WELLS AND ELONGATED SIEVES
Abraham Adler Hirsch, 141 Norwood St., Shreveport, La. 71105
Filed Jan. 26, 1967, Ser. No. 612,044
Int. Cl. E21b *43/08;* B01d *29/10*
U.S. Cl. 166—233                6 Claims

ABSTRACT OF THE DISCLOSURE

Since encrustation and corrosion of screens in wells are velocity dependent effects, and the inflow of liquid is predominantly greatest at the top portion, reduction in yield will first occur there, and gradually work downward toward the bottom as the screen progressively becomes blocked. A flow equalizing insert, having an appropriate orifice pattern, running the length of the screen and spaced therefrom, prevents inequalities in influx, thus protecting the screen against spotty high velocities and consequent deterioration.

---

My invention relates to an improvement in the construction of screens for wells, particularly those used for ground water procurement and esspecially in unconsolidated formations. It is also applicable to any well which mines underground fluid in quantity, such as radial infiltration galleries, heavily flowing oil wells and to injection wells for disposal of wastes or for water flooding in the secondary recovery of petroleum. Its principle applies also to tubular filters and to elongated strainers or sieves. The primary aim of this innovation is to permit longer production life, greater sustained yield and lower operating maintenance of ground water wells and analogous structures by controlling the passage of fluid across the screen at substantially a uniform velocity throughout its length.

In brief summary, the flow pattern across the screen of a well is changed from a characteristically unequal distribution of influx, with heaviest concentration of flow at the top thence tapering to a minimum flow at the bottom, to an equal distribution over the entire length of the screen. This objective is accomplished by means of a control insert placed within the screen. This insert, orificed over its length in a manner inverse to the areal rates of influx through a screen not so equipped, is spaced from the screen structure to permit access of liquid to the control orifices. Uniform flow through the screen then results, followed by improved operating conditions and reduced depreciation as hereinafter described.

In developing a water well various means are employed for agitating the granular material at the level of the screen, either naturally present sands or a gravel pack. This action removes most of the finer material and eventually forms innumerable bridges between the remaining grains and in the gravel annulus if one is present. In the production phase, a uniform velocity through this structure is desirable in order to avoid dislocations within this bridgework. In this way a clear water will be yielded for a long period provided the development operations were initially completed. A low velocity through the primary screen openings, not to exceed 2 feet per second, is generally regarded for an upper limit to avoid shearing action in the adjacent sand formation or in the gravel pack.

Now the flow of ground water into a screen, even in a homogeneous stratum, is decidedly non-uniform. Most of the water enters through the openings at the top since this position is under the least hydrostatic pressure. This condition obtains in pumped wells because the top of the screen is the closest position to the pump suction and in flowing wells because the top of the screen is closest to the discharge at the surface. Considering descending parts of the screen: less and less volume of water finds entry. The concentration of flow lines at the top of the screen tends to dislodge the bridging of the sand grains tributary thereto, whereas the sand arrangements further down the screen are unaffected and not yielding their full capacity. Therefore, a device which would spread the influx evenly throughout the whole length of the screen would preserve the integrity within the upper zones and, at the same time, would permit a higher yield from the lower zones. Hence an object of my invention is to even the flow of ground water along the complete length of a well screen. Another object is to spare the upper sections of the screen an undesirably high entrance velocity while the lower portions are flowing under-capacity. Since these effects together will increase the overall production, a further object of my invention is to permit more overall production over the whole length of screen and over the life of the well.

As the service span of the well increases the uppermost sand layers will be shifted and disarranged first. Heaviest influx of water will then shift to the next lower portion of the screen. Later this new area of highest yield will become impacted and the zone of highest production will drop still further down the screen. This process will continue until eventually the whole of the contributory sand layer about the screen will have become unyielding by advancing piecemeal deterioration. Restoration is then necessary by bailing, surging, detonating and allied operations. If the influx of ground water had been made uniform over the length of the screen this damaging process would never had started in the first place. Hence another object of his invention is to forestall the progressive decrease in yield of wells caused by step-wise impaction of said grains across the thickness of the aquifer.

Many ground waters are either incrusting or corrosive, frequently notoriously so. The resultant deposition of scale or the plugging of the screen openings by products of corrosion accelerate the rate of depletion of the well. Both of these actions are affected by the velocity of water through the screen openings. Carbonate scale, particularly, will form at points where the partial pressure of carbon dioxide is reduced locally by the hydraulic drop in pressure caused by velocity. Likewise, corrosion speeds up as higher velocities of flow present more fresh electrolyte to the corroding surfaces. Since both damaging actions are velocity-related, the avoidance of localized high velocities at the top of a screen will estop their incidence here, and its eventual advance downward, in many installations. Hence another object of this invention is to impede the incidence and progress of encrustation and corrosion in a well screen.

Heretofore, a screen has been regarded simply as a sieve or separating device for straining granular solids from an advancing liquid stream, in short, a phase separation apparatus. An added function will now be assigned to the screen, that of flow regulation. In order to accomplish this objective an additional element must be provided. This flow distributive components may be an inserted member or it may even be built into the support structure of conventional wire wound types of screens. In this latter case, an additional physical part is obviated. Another object then of my invention is to introduce the concept of flow regulation into relatively long influent structures.

Usually, as in wells and infiltration galleries, the effluent section is at a comparatively long distance from the influent areas. In strainers, tubular filters and the like, the influent elements are located closer to the effluent devices. In both cases, however, the principles of flow regulation described herein for attainment of uniform distribution over the influent member pertain.

At first thought, the principles of this invention might be considered as directly applicable to the areas and spacings of the screen openings themselves in wells, but closer thought will indicate that the open mesh area presented to the formation should be kept at a maximum consistent with the grain size. Any reduction in area at this spot would reduce at once the yield. Hence in a wire-wound or similar screen flow distribution should be controlled only by an element located within instead of on the sieve openings.

My method for establishing uniformity in flow throughout the length of a well screen consists in placing a perforated liner or insert within the screen, with openings in the liner or insert being graduated in area from the top to the bottom, the smallest area being at the top, with lesser restrictions in area toward the bottom. The resistance to influx is thus inverse to the natural tendency for entry of water into the unregulated screen. In this way uniformity in yield is obtained throughout the whole length of screen provided the formation is homogeneous.

This liner may be an insert or it may be included functionally as a part of the screen structure itself. Built-in control is provided by varying the size and frequency of holes or slots in the pipe support of wrapped or wound screens.

My innovations are shown in the drawing in which:

FIGURE 1 is a vertical cross section of a ground water well with a continuously wire wound ribbed screen in position, having a tapered flow equalizer in the barrel of the screen, FIGURE 2 is a vertical cross section of a wire wound slotted wire screen with a cylindrical flow equalizer tube inserted therein, FIGURE 3 is an elevation of a section of a wire wrapped slotted screen having graduated sizing of the slots in the supporting tube, and FIGURE 4 is an elevation of a section of a simple slotted screen with flow control obtained by varying the size of the slots.

Considering now each of the illustrations separately:

FIGURE 1 shows in vertical cross-section the screen details of a ground water well located in the water bearing sands or aquifer 1 confined between an impervious upper aquiclude 2 and a lower aquiclude 3. A gravel pack 4 surrounds the screen structure 5 which is set at the bottom of casing 6 by means of lead packer 7. The upper sections of the casing, the pump and the eduction pipe contained therein are not shown here as their construction and arrangement as well established. Casing 6 is held in the drill hole by the cement jacket 7 which usually extends up to the surface of the ground.

The screen structure consists of a ribbed cage 9 made of a longitudinal array of bars or rods 10 continuously wound over with triangular section wire wrapping 11 welded thereto usually at every point of contact. Spacings 12 between successive turns form the sieve openings which block the ingress of sand but permit passage of water. The bars or ribs 9 stiffened by multiple points of welding with the strainer wire 11 form a rigid assembly 5. This assembly 5 is swaged in position at the bottom of casing 6 by means of the lead packer 7. Screen 5 sets solidly in a sprocket 13 in the lower aquiclude 3. The foregoing is a typical description of popular well construction as currently practiced.

My innovation, to distribute influx of ground water uniformly over the full height of screen 5, consists of an equalizing insert 14, here shown as a tapered or conical member, extending axially the height of the screen and perforated with openings 15 in a graduated manner from its bottom tip 16 to its top stiffening ring 17. A hole 18 is left at the bottom of the cone 14. The areas of opening at the bottom are larger than at the top of the insert with continuous variation between these limits. Ground water passes through openings 15 from the surrounding gathering space 19. Since the smaller area of cone openings is at the top the customary concentration of flow at this level is prevented, since relatively more of the yield must enter cone 14 from the lower portions. Since entry of water into the cone is uniformly distributed, the influx from the aquifer through the screen openings 12 is likewise uniformly distributed.

Cone 14 is held in place by means of its separate lead packer 20. Shoulder 21 of stiffening ring 17 rests on a support ring 22 which sets on the top of the ribbed screen cage 9. Support ring 22 extends upward half the height of insert stiffener ring 17 which it is bored or shouldered at 23 to receive. A threaded liner 24 inside of packer 20 is similarly bored at 25 to receive the upper half of the insert stiffening ring 17. Cone 14 is held in place by the wedging action of packer 20 and the grouted bottom 21 which is introduced, by means of hollow drill stem, through the opening 18 of apex 16.

Insert 14 may be placed in position after the well has otherwise been completed. Support ring 22 is first set over the screen packer 7, then the conical insert 14 is lowered to rest thereon. Packer 20, having internal threaded liner 24, is then lowered into place. The packer ring 24 is then swaged securely into position. Support ring 22 and packer liner 24 transit the impact of the blows from the tool directly to the screen packer 7, thus preventing breakage of the stiffener ring 17 in case the insert is made of plastic.

Grout is then added down the drill pipe through the hole 18 at the bottom of insert 14, thereby stabilizing it against side sway.

FIGURE 2 shows in vertical section another variant of the flow control principle in which the inserted tube is a perforated cylindrical shell 27, the number, size and arrangement of the opening 28 thereinto presenting greater area for passage of fluid the greater the distance from the top of the screen 29. These openings are distributed around the circumference of the cylinder 27 so that inflow is equal from all directions.

The screen assembly 29 consists of wire windings 30, upper 31 and lower 32 threaded connections, the flow control insert 27 and its upper 33 and lower 34 retaining rings. In this illustration the screen element 30 consists of continuous wire wrappings over a series of longitudinal spacer ribs 35 extending the height of the supporting base pipe core or skeleton 36. In this pipe are drilled holes 37, usually uniformly sized and spaced, through which the influx enters within the barrel 38 of the screen. The wire wrappings are held the desired spacing apart by means of integrally attached lugs or knobs 39. These wrappings extend between the upper 31 and the lower 32 threaded connection fittings.

Flow control insert 27 rests in a socket 40 in the lower retaining ring 34 which in turn is supported in the constricted curvature 41 of the male threaded pipe reducer 32. At its upper end insert 27 is held a similar socket 42 in the upper retaining ring 33.

This insert 27 may be set in position within the screen barrel 38 either before lowering the screen down the casing or it may be placed after the screen is set. Holes 43 and 44 in the upper and lower rings, respectively, permit a drill pipe to extend therethrough which initially washes mud from the gravel pack or formation through a back pressure valve (not shown) which screws on the threads of he lower fiitting 32.

FIGURE 3 demonstrates a method for combining the support function of the slotted pipe core 45 with flow control without the necessity for an insert such as described in FIGURES 1 and 2. FIGURE 3 shows in elevation a section of a wire wound slotted pipe or tubular screen 46 in which the wire wrapping 30 is wound over ribs 47 welded to the base pipe core 45. Slots 12 between adjacent windings are formed by the lugs 39 which are rolled into the wire. Holes 48 in the pipe core 45 permit running from the wire screen 30 to enter the barrel 49 of the assembly. Prior to my application, the perforations or slots 48 in the core 45 have been uniformly sized and spaced.

This version of my invention consists in varying the size and frequency of these holes 48 so that the lower their position on the core the greater their area open for influx. Their size may be varied by changing their length, width or both, assuming rectangular slots, since these openings are parallel to the direction of the vertical ribs 47.

The method for setting such a screen will be the same as for the conventional perforated pipe base screen.

Influent ground water will find easier ingress toward the bottom portion 50 of the screen to offset the tendency for entry toward the top 51 closer to the pump, thereby evening the flow through the wire windings and in the surrounding formation.

Frequently, for reasons of economy or expected short period of usage, or in gross or consolidated formations, screens are simplified by omitting the wire wrapping or their equivalent. In such installations a bare slotted pipe may be set in the drill hole as a screen. Until this invention, the slots have been uniform in size and distribution.

FIGURE 4 illustrates a bare slotted pipe screen 52. Slots 53 vary in size and spacing so that the higher their position on the screen the smaller the area open for influx of ground water. This type of screen is installed and used the same as an ordinary slotted pipe screen. The portion of the slotted screen toward the top is numbered 54, and the portion toward the bottom is numbered 55.

The foregoing discussions assume a fair degree of uniformity in the aquifer. For cases in which the water bearing stratum is heterogeneous in size of sand grains the principle of the flow control insert may still be utilized by considering the hydraulic characteristics of each portion of the aquifer separately to distribute the flow uniformly over same. The holes in the control insert are next adjusted to obtain the desired influx distribution over the total height of the screen. Also when the screen draws from a plurality of aquifers the hydraulic characteristics of each are judged in distributing the areal openings on the flow control element. When more than one screen is set in tandem, the top of the uppermost screen is the datum for flow control hole placement.

Similarly when a screen is horizontally or obliquely positioned in an aquifer the same principle of areal distribution of openings in the flow control member applies as when the screen is set in the more conventional vertical alignment.

The illustrations have been discussed from the viewpoint of ground water production, particularly from vertical wells. However, this invention may likewise be applied with similar effectiveness to horizontal wells of infiltration batteries or to injection wells for disposal of wastes or to waterflood wells for fluid drive in the secondary recovery of oil. These principles and structures may likewise be applied to the construction of filter candles, strainers on pump suctions, or to drains extending into tanks or pits. In general terms this flow equalizer will even out the flow lines across any comparatively long, hollow barrier to the passage of fluids, liquid or gaseous. This includes sieves, screens, strainers, filter candles, porous tubes, pervious elongated membranes and similar permeable media. A source of pressure drop is usually provided at one of the barriers only, such as pumps in wells, or suction at strainers. The perforated equalizer is inserted within the bore of the barrier, coextensive therewith, as described in the case of wells. Concentration of perforations is greater the farther their distance from the end of the barrier to which the pressure differential producer is connected.

As a further generalization, this flow equalization principle and device may even be applied to tubular barriers having pressure drives at both ends by minimizing the concentrations of perforations per unit length in the flow equalizer toward both ends and maximizing the area of holes toward the middle.

I claim:
1. An influx equalizer well screen consisting of a supporting pipe having perforations therein, said perforations running discontinuously the length of said pipe, the areal distribution of said perforations per unit length of said supporting pipe varying from a minimum at the top thereof to a maximum at the bottom thereof, rods extending longitudinally the length of said pipe, wire wrapping around said pipe over said rods leaving a space between said wire wrapping and said supporting pipe, spacing between successive turns of said wire wrapping and means for maintaining the width of said spacing.

2. An influx equalizer for water well screens comprising a hollow longitudinal control element affixed axially therein with a space therebetween, said control element extending the height of said screen, perforations in said control element to permit passage of ground water thereinto, the areal distribution of said perforations per unit length of said control element varying from a minimum at the top thereof to a maximum at the bottom thereof, said screen consisting of wire wrapping attached to a ribbed supporting cage, space between said ribs running the length of said screen, spacing between successive turns of said wire wrapping, said spacing being preserved by fixation to said ribbed cage.

3. Claim 2 in which said hollow longitudinal flow control element is a conical shell with an opening at the bottom thereof large enough for introduction of a drill pipe for the purpose of grouting.

4. Claim 3 in which said means for retaining said conical shell within said ribbed cage comprises a stiffening ring at the top of said conical shell integral therewith, a seating ring the bottom of which rests atop a lead packer for said screen, a lead packer for securing said flow control element, said packer resting on said seating ring, contiguous cut outs in the top of said seating ring and the bottom of said lead packer for said control element for receiving said stiffening ring and a bed of grout at the bottom of said ribbed cage into which the bottom of said conical flow control element extends.

5. Claim 2 in which said hollow longitudinal flow control element is a cylindrical sheel.

6. Claim 5 in which said cylindrical shell is affixed within said ribbed supporting cage by a pair of retaining rings, the top said retaining ring being attached to a sleeve on top of said ribbed supporting cage and provided with a socket in its base which seats onto said cylindrical shell, the bottom said retaining ring nesting within a bottom pipe fitting on said ribbed supporting cage, a socket in said bottom retaining ring which receives the bottom edge of said cylindrical shell, openings in both said top and bottom retaining rings of sufficient diameter to permit passage of drill pipe, tools and appurtenances to attach on the bottom of said ribbed supporting cage for completion of the well.

References Cited

UNITED STATES PATENTS

| | | | |
|---|---|---|---|
| 939,497 | 11/1909 | Hammett | 210—291 X |
| 1,855,904 | 4/1932 | Brown et al. | 210—497 X |
| 2,028,520 | 1/1936 | Phillips | 210—497 X |
| 2,046,459 | 7/1936 | Johnson | 166—233 |
| 2,489,292 | 11/1949 | Hobbs | 210—497 |
| 2,019,418 | 10/1935 | Lang | 166—10 |
| 2,611,436 | 9/1952 | Carr et al. | 166—10 |

DAVID H. BROWN, *Primary Examiner.*

U.S. Cl. X.R.

166—236; 210—497